(12) United States Patent
Gulley et al.

(10) Patent No.: US 11,476,728 B2
(45) Date of Patent: Oct. 18, 2022

(54) ELECTRIC MACHINE HAVING A CONTAINMENT BAND

(71) Applicant: GE Aviation Systems LLC, Grand Rapids, MI (US)

(72) Inventors: Jason Randall Gulley, Liberty Township, OH (US); Xiaochuan Jia, Centerville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 17/150,047

(22) Filed: Jan. 15, 2021

(65) Prior Publication Data

US 2022/0231556 A1 Jul. 21, 2022

(51) Int. Cl.
*H02K 1/28* (2006.01)
*H02K 1/02* (2006.01)
*F02C 7/32* (2006.01)
*H01F 7/02* (2006.01)

(52) U.S. Cl.
CPC ............... *H02K 1/28* (2013.01); *F02C 7/32* (2013.01); *H01F 7/021* (2013.01); *H02K 1/02* (2013.01)

(58) Field of Classification Search
CPC .... H02K 1/28; H02K 1/02; F02C 7/32; H01F 7/021
See application file for complete search history.

(56) References Cited

U.S. PATENT DOCUMENTS

| 4,044,305 A | 8/1977 | Oberbeck |
| 6,150,747 A | 11/2000 | Smith et al. |
| 8,089,189 B2 | 1/2012 | Himmelmann |
| 8,878,409 B2 | 11/2014 | Legros et al. |
| 8,917,003 B2 | 12/2014 | Rasmussen et al. |
| 9,941,758 B2 | 4/2018 | Geis et al. |
| 10,190,206 B2 | 1/2019 | Dial et al. |
| 10,229,777 B2 | 3/2019 | Zou et al. |
| 10,578,117 B2 | 3/2020 | Barthes et al. |
| 10,763,715 B2 | 9/2020 | Loder et al. |
| 2005/0040721 A1 | 2/2005 | Kusase et al. |
| 2008/0143207 A1 | 6/2008 | Shah et al. |

FOREIGN PATENT DOCUMENTS

| EP | 2560270 A1 | 2/2013 |
| EP | 3599704 A1 | 1/2020 |

*Primary Examiner* — Mohamad A Musleh
(74) *Attorney, Agent, or Firm* — McGarry Bair, PC

(57) ABSTRACT

A rotor assembly comprising rotatable element defining a periphery, a first set of elements defining magnetic pole regions and a second set of elements defining interpolar regions that alternately placed about the periphery. The rotor assembly further comprising a containment band circumscribing the first set of elements and the second set of elements. The containment band defining a first set of material and a second set of material, with each overlying at least a portion of the first set of elements or the second set of elements.

20 Claims, 8 Drawing Sheets

ELECTRIC MACHINE HAVING A CONTAINMENT BAND

TECHNICAL FIELD

This disclosure generally relates to an electric machine, and more specifically to a containment band of the electric machine.

BACKGROUND

Electric machines, such as electric motors or electric generators, are used in energy conversion. In the aircraft industry, it is common to find an electric motor having a combination of motor and generator modes, where the electric machine, in motor mode, is used to start an aircraft engine, and, depending on the mode, functions as a generator, too, to supply electrical power to the aircraft systems. The electric machine can further drive other portions of the aircraft engine such as a forward fan or a propeller. Regardless of the mode, an electric machine typically includes a stator with windings that works in conjunction with a rotor that also has windings and is driven to rotate by a source of rotation, which for a generator can be a gas turbine engine or for a motor can be the stator.

Exemplary electric machines can include a main generator, exciter, and a permanent magnet generator (PMG). The PMG is used to power the stator of the exciter. In addition to this main electric generator PMG, additional PMGs can be utilized to power the on-board aircraft flight computers or other electrical loads of the aircraft.

BRIEF DESCRIPTION

In one aspect the disclosure relates to a rotor assembly comprising a rotatable element defining a rotational axis and a periphery, a first set of elements disposed on at least a portion of the periphery and defining magnetic pole regions, a second set of elements disposed on at least a portion of the periphery and defining interpolar regions, wherein the first set of elements and the second set of elements are alternately placed along the periphery, and a containment band circumscribing the first set of elements and the second set of elements, the containment band defining a first set of material at least partially overlying the first set of elements and a second set of material at least partially overlying the second set of elements.

In another aspect the disclosure relates to a rotor assembly comprising a rotatable element defining a rotational axis and a periphery, a first set of elements disposed at the periphery, a second set of elements being disposed on at least a portion of the periphery, wherein the first set of elements and the second set of elements are alternately placed along the periphery, and a containment band circumscribing the first set of elements and the second set of elements, the containment band defining a first set of material with a first magnetic permeability and a second set of material with a second magnetic permeability lower than the first magnetic permeability, wherein the first set of material and the second set of material are alternately spaced.

In yet another aspect the disclosure relates to a method of assembling a rotor assembly, the method comprising forming a rotatable element defined by a periphery, alternately spacing a first set of elements and a second set of elements about the periphery, with the first set of elements defining magnetic poles regions and the second set of elements defining interpolar regions, and overlying at least a portion of the first set of materials with a portion of a containment band including a first set of material defined by a first magnetic permeability, and at least a portion of the second set of elements with a portion of the containment band including a second set of material defined by a second magnetic permeability less than the first magnetic permeability.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
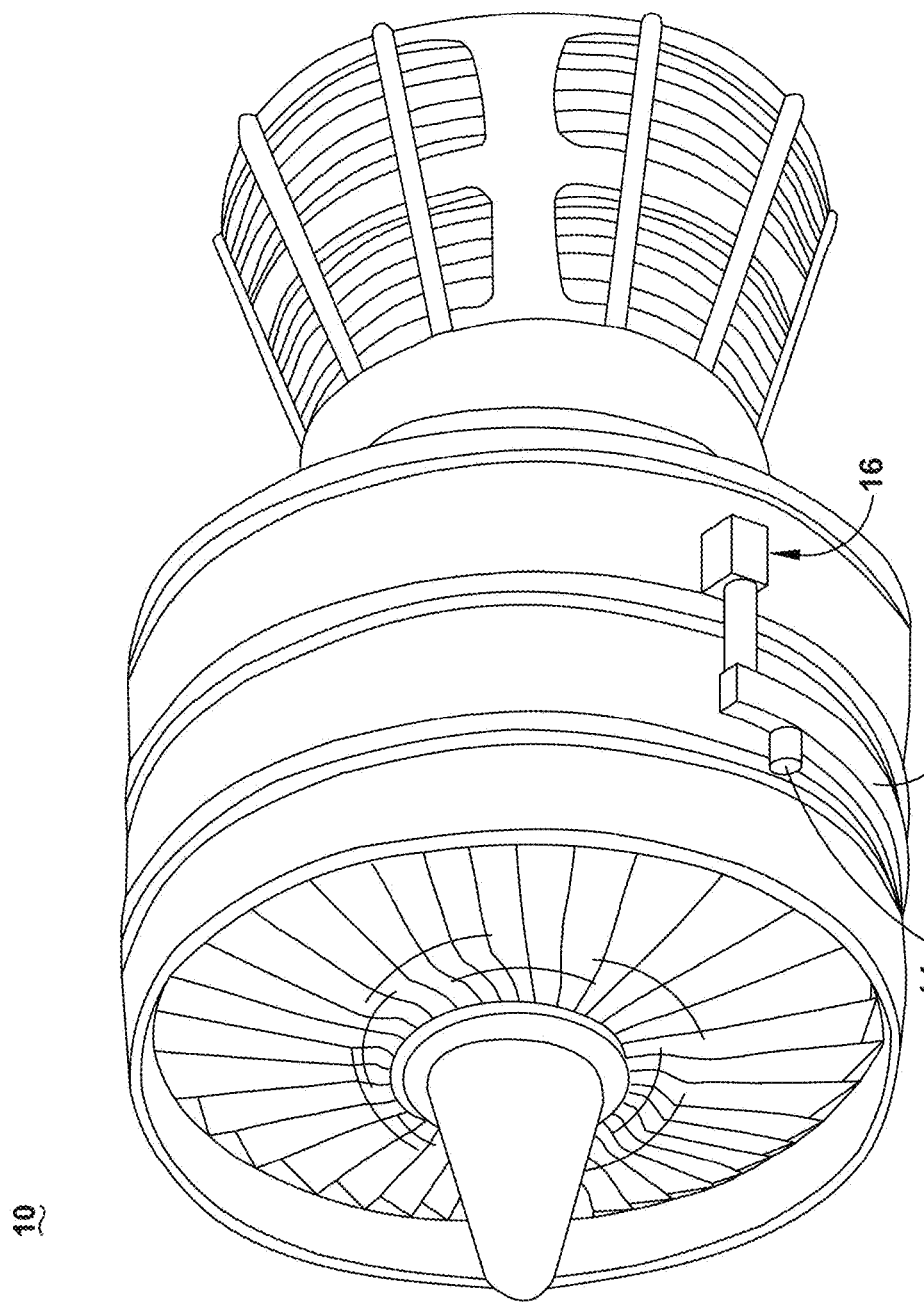
FIG. 1 is an isometric view of a gas turbine engine having an electric machine, in accordance with various aspects described herein.

Aspects of the disclosure described herein are directed to an electric machine, and more specifically to a rotor assembly for an electric machine. The rotor assembly, as described herein, can include a rotatable element defining a rotational axis and a periphery. A first set of elements and a second set of elements can be alternately spaced about the periphery. The first set of elements can define magnetic pole regions, while the second set of elements can define interpolar regions between the adjacent elements of the first set of elements. As used herein, the phrase "magnetic pole" can refer to any region within the rotor assembly defined by magnetic properties that generate a magnetic pole. For example, the magnetic poles can be defined by a region of the rotor assembly magnetized by a magnetic element of the rotor assembly such as, but not limited to, a permanent magnet, an energizable or electromagnetic rotor winding that gains magnetic properties when energized by electric current, or a magnetic material. As used herein, "magnetic element", "magnetized element, or the like, can refer to any element of the rotor assembly including magnetic properties configured to generate a magnetic field. As used herein, the term "interpolar" can refer the space or connection between magnetic poles. For example, two adjacent first elements of the first set of elements can define two magnetic poles such a second element of the second set of elements disposed between the two adjacent first elements can define an interpolar region between the two adjacent first elements.

A containment band can circumscribe at least a portion of the first set of elements and the second set of elements, and be defined by a first set of material that overlies at least a portion of the first set of elements and a second set of material that overlies at least a portion of the second set of elements. The first set of material can be defined by a first magnetic permeability and the second set of material can be defined by a second magnetic permeability that is lower than the first magnetic permeability. It is contemplated, that the first set of material and the second set of material can be alternately spaced about the circumference, and can further correspond to the underlying first set of elements and the second set of elements, respectively. Additionally, or alternatively, at least a portion of the first material or at least a portion of the second material can be skewed such that the first set of material and the set of second material both overlay a portion of both the first set of elements and the second set of elements. As used herein, the term "skew", "skewed", or iterations thereof can refer to the angling of at least one element (e.g., the first or second material) such that a direction of extension of the at least one element is not parallel with a direction of extension of the element that it overlies or is overlain by.

For the purposes of illustration, one exemplary component will be described in the form of an electric machine, specifically a generator, for a gas turbine engine and having a rotor assembly including the containment band as described herein. It will be appreciated however, that the electric machine can be in the form of a generator, a motor, a Permanent Magnet Generator (PMG), a Surface Permanent Magnet Generator (SPMG), or a starter/generator (S/G) in non-limiting examples. It will be further understood, however, that aspects of the disclosure described herein are not so limited and can have general applicability within other electric machines or systems. For example, the disclosure can have applicability for systems in other engines or vehicles, and may be used to provide benefits in industrial, commercial, and residential applications.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

FIG. 1 illustrates a gas turbine engine 10 having an Accessory Gear Box (AGB) 12 and an electric machine, specifically a generator 14, according to an aspect of the disclosure. The gas turbine engine 10 can be a turbofan engine commonly used in modern commercial aviation. For example, the gas turbine engine 10 could include a turboprop or turboshaft. The AGB 12 can be coupled to a turbine shaft (not shown) of the gas turbine engine 10 by way of a mechanical power take off 16. The gas turbine engine 10 can be any suitable gas turbine engine used in modern aviation. For example, the gas turbine engine 10 can be any of a variety of other known gas turbine engines such as a turboprop, turboshaft, or a counter-rotating turbine engine. The type and specifics of the gas turbine engine 10 are not germane to the disclosure and will not be described further herein. Further yet, although described in terms of the gas turbine engine 10, it will be appreciated that the generator 14 can be included within any suitable engine or prime mover. While a generator 14 is shown and described, it will be appreciated that the generator 14, can be any electric machine including, but not limited to, an electric motor or a starter/generator.

Figure 2:
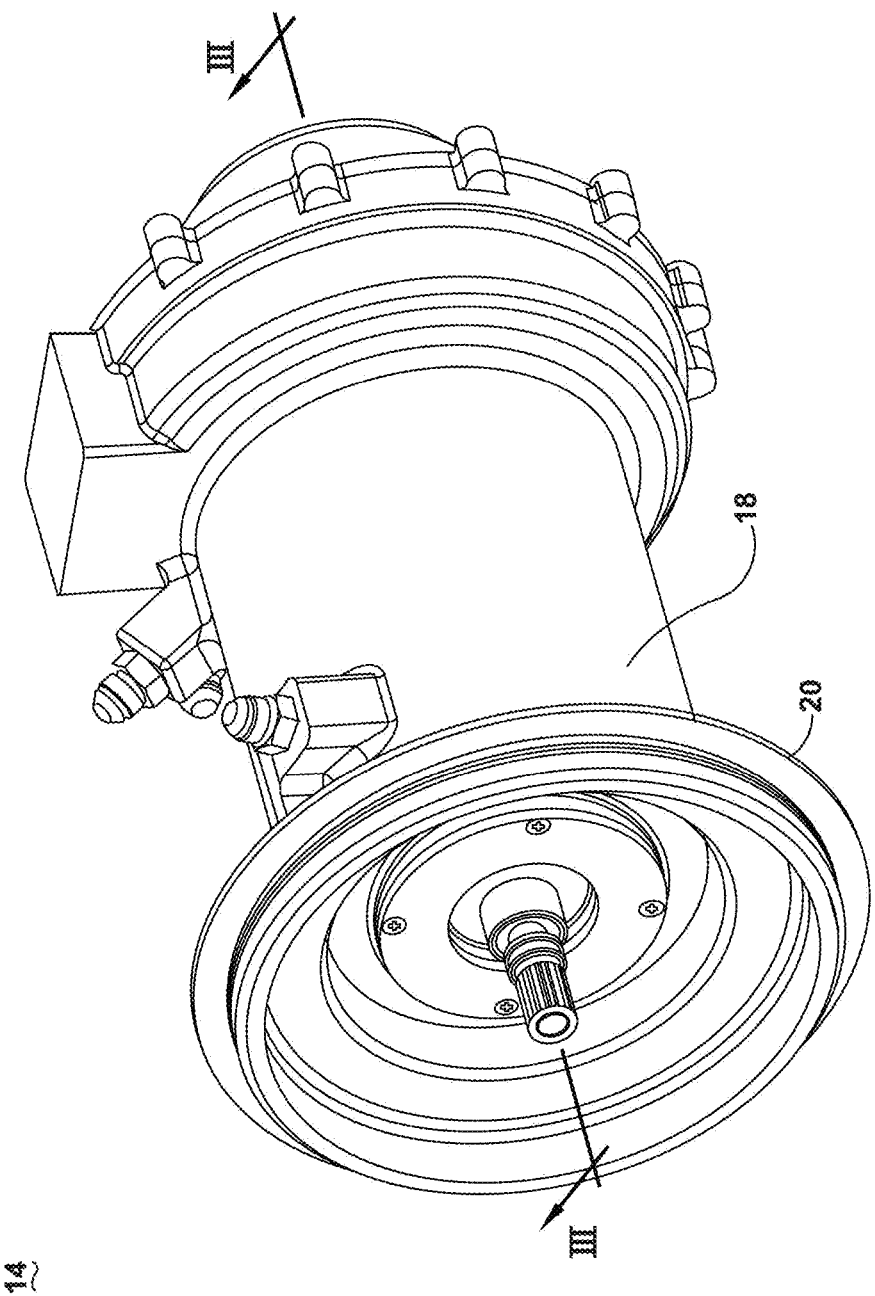
FIG. 2 is an isometric view of an exterior of the electric machine of FIG. 1, in accordance with various aspects described herein.

FIG. 2 illustrates a non-limiting example generator 14 and its housing 18 in accordance with aspects of the disclosure. The generator 14 can include a clamping interface 20, used to clamp the generator 14 to the AGB 12 (FIG. 1). A set of electrical connections can be provided on the exterior of the generator 14 to provide for the transfer of electrical power to and from the generator 14. The set of electrical connections can be further connected by cables to an electrical power distribution node of an aircraft having the gas turbine engine 10 to power various items on the aircraft, such as lights and seat-back monitors.

Figure 3:
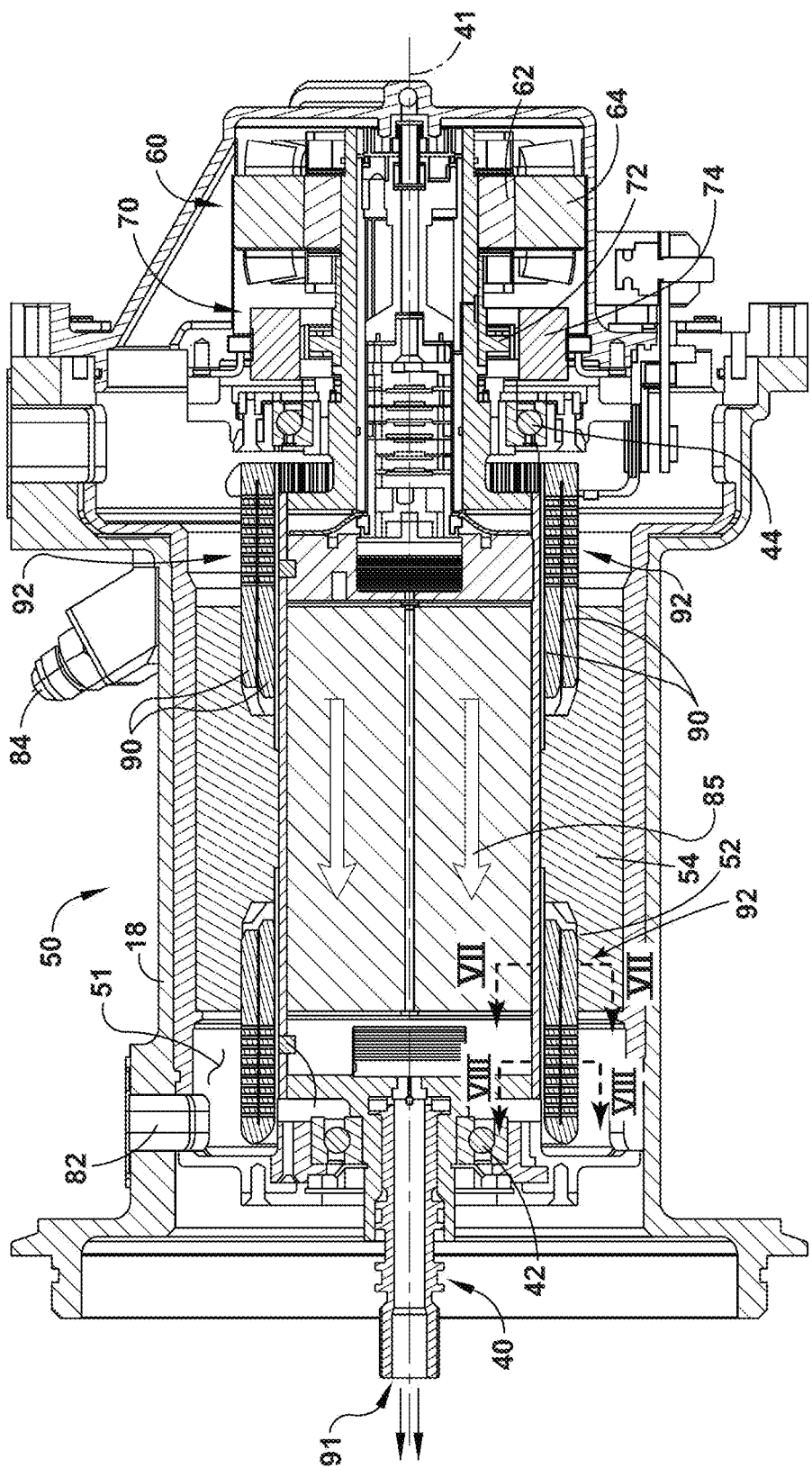
FIG. 3 is a schematic cross-sectional view of the electric machine of FIG. 2, taken along line of FIG. 2, in accordance with various aspects described herein.

A non-limiting interior of the generator 14 is best seen in FIG. 3, which is a cross-sectional view of the generator 14 shown in FIG. 2 taken along line A drive shaft 40 is located within the generator 14 and is the primary structure for supporting a variety of components. The drive shaft 40 can have a single diameter or one that can vary along its length. The drive shaft 40 is supported by spaced bearings 42 and 44 and configured to rotate about a rotational axis 41. Several of the elements of the generator 14 have a fixed component and a rotating component, with the fixed component fixed relative to the housing 18 and with the rotating component being provided on, or rotatably fixed relative to the drive shaft 40. Examples of these elements can include a main machine 50 or electric machine, housed within a main machine cavity 51, an exciter 60, and a PMG 70. It will be appreciated that the electric machine can specifically be a Pulse-Width Modulation (PWM) driven electric machine, or any other suitable electric machine such as, but not limited to, a 50/60 Hz sine wave machine. The corresponding rotating component comprises a main machine rotor 52, an exciter rotor 62, and a PMG rotor 72, respectively, and the corresponding fixed component comprises a main machine stator assembly 54 or stator assembly, an exciter stator 64, and a PMG stator 74. In this manner, the main machine rotor 52, exciter rotor 62, and PMG rotor 72 are disposed on and co-rotate with the drive shaft 40. The fixed components can be mounted to any suitable part of the housing 18, and include the main machine stator assembly 54, exciter stator 64, and PMG stator 74. Collectively, the fixed components define an interior through which the drive shaft 40 extends and rotates relative to.

It will be understood that the main machine rotor 52, exciter rotor 62, and PMG rotor 72 can have a set of rotor poles, and that the main machine stator assembly 54, exciter stator 64, and PMG stator 74 can have a set of stator poles. The set of rotor poles can generate a set of magnetic fields relative to the set of stator poles, such that the rotation of the rotor magnetic fields relative to the stator poles generate current in the respective stator components.

At least one of the rotor poles and stator poles can be formed by a core with a post and wire wound about the post to form a winding, with the winding having at least one end turn 92 or end winding. Additionally, or alternatively, at least one of the main machine rotor 52, exciter rotor 62, or PMG rotor 72 can include a set of magnetic materials instead of the winding. The magnetic material can be, but is not limited to, a permanent magnet. In such a case, it will be appreciated that the set of magnetic materials can be referred to as the set of rotor poles configured to generate a set of magnetic fields relative to the set of stator poles.

It can be seen in FIG. 3 that the main machine stator 54 includes a stator core 89 having at least one post. A set of stator windings 90 are formed when a conductor or conductive wire is wound about the post or stator core 89. The set of windings 90 can also include a winding segment that extends across either the front or rear of the post or stator core 89, forming at least one end turn 92.

During power-generating operations, the drive shaft 40 is mechanically powered, driven, or rotated by a force, such as the mechanical energy of the engine 10, about a rotational axis 41. The relative rotational motion of the drive shaft 40 and co-rotating components, including at least the main machine rotor 52, relative to the fixed or stationary stator components, including at least the main machine stator 54, generates electrical power in the set of stator windings 90 due to the interaction of the generator 14 magnetic fields. The electrical power generated in the set of stator windings 90 can be conductively connected to, and further delivered to, at least one electrical load. In one non-limiting aspect, the generator 14 can provide the electrical power to a power distribution system or power distributed network.

Non-limiting aspects of the generator 14 can be any combination of known generators. For example, the main machine 50 can be either a synchronous or asynchronous generator. In addition to the aspects described herein, additional component, devices, or the like can be included to provide secondary generator 14 operations or functions. For instance, in one non-limiting aspect of the disclosure, the generator 14 can include electromechanical accessories, or other accessories driven from the rotation of the drive shaft 40, including but not limited to, an oil pump, a fluid compressor, a hydraulic pump, or the like.

Further non-limiting aspects of the generator 14 can further include oil cooling or an oil cooling system for controlling the supply of oil to the oil cooling system. The cooling oil can be used to dissipate heat generated by the electrical and mechanical functions of the generator 14. The oil system can also provide for lubrication of the generator 14. In one non-limiting example, the cooling system can further include, for example, a cooling fluid reservoir and various cooling passages. The drive shaft 40 can provide one or more flow channels or paths for the main machine rotor 52, exciter rotor 62, and PMG rotor 72. In one non-limiting example aspect of the cooling system, can receive a flow of cooling oil (shown as arrow 85) by way of a first port (e.g. 84 or 82) which can be provide via a main machine reservoir or coolant reservoir, to the drive shaft 40, to a shaft outlet port 91. While the generator 14 is shown as including the liquid coolant system, aspects of the disclosure are applicable to a generator 14 or without the liquid coolant system.

In the above-mentioned aircraft generator, the PMG assembly 70 is used to power the stator 64 of the exciter 60. In addition to this PMG assembly 70, there are other PMG assemblies 70 used to power the on-board aircraft flight computers, or a variety of other loads such as, but not limited to, actuators, electrical busses, batteries, deicing equipment, motors, flight controls, back up equipment, or any combination thereof.

Figure 4:
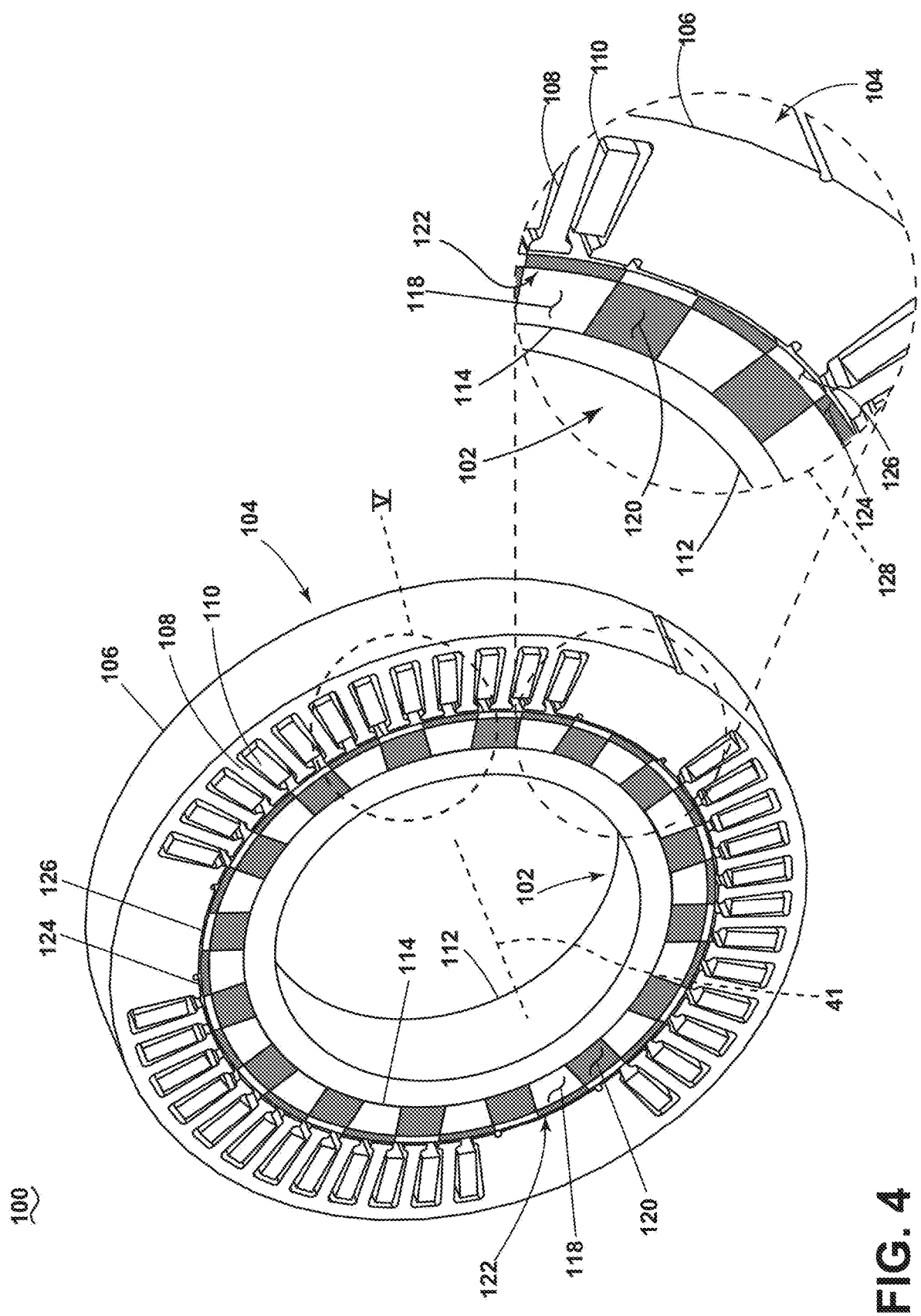
FIG. 4 is a perspective view of a rotor/stator assembly of the electric machine of FIG. 2, further including a rotor assembly with a containment band, in accordance with various aspects as described herein.

FIG. 4 is a perspective view of a rotor/stator assembly 100 of the electric machine of FIG. 3, further including a rotor assembly 102 and a stator assembly 104. It will be appreciated that the rotor assembly 102 and stator assembly 104 of the rotor/stator assembly 100 can be any suitable rotor or stator, respectively, for any suitable electric machine. For example, the rotor assembly 102 can be, but is not limited to, the main machine rotor 52, exciter rotor 62, the PMG rotor 72, or any other suitable rotor such as, but not limited to, an SPMG rotor. The stator assembly 104 can be, but is not limited to, the main machine stator assembly 54, exciter stator 64, the PMG stator 74, or any other suitable stator such as, but not limited to, an SPMG stator. Similarly, the electric machine can be any suitable machine such as, but not limited to, the generator 14, an electric motor, or a starter/generator.

A rotatable element 112 can be provided within the rotor assembly 102. The rotatable element can be any suitable element configured to rotate about a rotational axis 41 such as, but not limited to, a drive shaft (e.g., the drive shaft 40), or a rotor core fixed relative to the drive shaft and configured to co-rotate with the drive shaft. The rotatable element 112 can extend from the rotational axis 41 in the radial direction from an inner portion to a periphery 114 opposite the inner portion. The periphery 114 can define surface provided along an outer radial limit of the rotatable element 112. As illustrated, the rotatable element 112 can be formed as a ring such that the periphery 114 is defined by an outer circumference of the ring.

A first set of elements 118 and a second set of elements 120 can be disposed along at least a portion of the periphery 114. Specifically, the first set of elements 118 and the second set of elements 120 can be alternately spaced about the periphery 114, such as in a circumferentially alternating pattern (relative to the rotational axis 41) such that a second element 120 is provided between any two adjacent first elements 118, and vice versa. As illustrated, the first set of elements 118 and the second set of elements 120 can extend in the circumferential direction along the periphery 114 of the rotatable element 112, however, it will be further appreciated that the first set of elements 118 and the second set of elements 120 can also extend in the axial direction along the periphery 114. Specifically, the first set of elements 118 and the second set of elements 120 can extend in the axial direction parallel to the rotational axis 41.

It is contemplated that either the first set of elements 118 can define magnetic pole regions, while the second set of elements 120 can define interpolar regions between the adjacent first elements 118 of the first set of elements 118. The magnetic pole regions can further be defined as a region of the rotor assembly 102 where a magnetic flux within the rotor assembly 102 leaves or enters the rotor assembly 102, while the interpolar regions can be defined as the space between the magnetic pole regions. It will be appreciated that the first set of elements 118 and the second set of elements 120 be equally sized and equally spaced about the periphery 114. Additionally, or alternatively, one or more elements of the first set of elements 118 or one or more elements the second set of elements 120 can be differing sizes from one another or be spaced varying distances from one another. For example, it is contemplated that in some instances adjacent elements of the first set of elements 120 can physically touch such that the second set of elements 120 can be defined by the space where the adjacent elements of the first set of elements 118 meet. In other words, the rotor assembly 102 can be formed such that the magnetic pole regions are adjacent to, and touching each other and the interpolar regions are where the adjacent magnetic pole regions meet.

The first set of elements 118 defining the magnetic pole regions can include, but is not limited to, permanent magnetics, electromagnets, magnetically permeable material, or any combination thereof. The second set of elements 120 defining the interpolar regions can include, but is not limited to, permanent magnets, magnetic material, non-magnetic material, an energizable winding, a void (e.g., a vacuum), or any combination thereof. Specifically, the second set of elements 120 can include, but is not limited to high and low relative permeability materials, 1010 steel, 1018 steel, 1020 steel, 4140 steel, 4130 steel, silicon steel, cobalt iron alloys, nickel iron alloys, stainless steel, an absence of material (e.g., vacuum or void), or any combination thereof.

The material, size, and spacing of the first set of elements 118 and the second set of elements 120 can vary depending on the type or design of electric machine. As a non-limiting example, in the case of the PMG assembly 70, the second set of elements 120 are defined by permanent magnets, defining the interpolar regions, while the first set of elements 118 can be defined by a set of posts including a magnetically permeable material (e.g., steel) that facilitate the conduction of magnetic flux through the first set of elements 118, thus defining the magnetic pole regions. As yet another non-limiting example, in the case of an SPMG assembly, the first set of elements 118 can be defined by permanent magnets, defining the magnetic pole regions, while the second set of elements 120 can be defined by a vacuum or void, defining the interpolar spaces.

It is further contemplated that the first set of elements 118 and the second set of elements 120 can further be defined by their magnetic permeability. As used herein, the term "magnetic permeability" can refer to a measure of the resistance of a material against the formation of a magnetic field or a materials capacity to allow a magnetic flux to pass through it. For example, a "high" magnetic permeability means that the material has a relatively high capacity to pass magnetic fields or magnetic flux through the material (e.g., a larger amount of magnetic flux can be focused or concentrated through the material), when compared to a material with a "low" magnetic permeability, which means that the material has a relatively low capacity to pass magnetic fields or magnetic flux through the material. In the case of the second set of elements 120 not being defined by a void, the first set of elements 118 can have a lower permeability than a permeability of the second set of elements 120. Additionally, or alternatively, the magnetic permeability of the first set of elements 118 can be similar to or the same as the magnetic permeability of the second set of elements 120 such as in the case of the second set of elements 120 being defined by a void.

In one non-limiting example, and as illustrated, the first set of elements 118 can be defined by a set of posts including a magnetically permeable material (e.g., steel) that facilitate the conduction of magnetic flux through the first set of elements 118, while the second set of elements can be defined by a set of magnetic elements including a first set of magnetic materials and a second set of magnetic materials (e.g., permanent magnets) that generate a magnetic flux that passes through the set of posts (e.g., the first set of elements 118) to define the magnetic poles. In other non-limiting example, however, the first set of elements 118 can include the magnetic materials including the first set of magnetic materials and the second set of magnetic materials, each defining a magnetic pole, and the second set of elements 120 can be defined by a void or vacuum. In any case, the first set of magnetic materials and the second set of magnetic materials can be oppositely magnetized with respect to one another and be alternately spaced about the periphery 114 of the rotatable element 112. As the first set of magnetic materials and the second set of magnetic materials are oppositely charged, a magnetic field or a magnetic circuit can be generated between the two. As used herein, the term "magnetic circuit" can refer to a closed loops path of a magnetic flux of the magnetic field generated by the set of magnetic materials (e.g., the first set of magnetic materials and the second set of magnetic materials).

The first set of elements 118 and the second set of elements 120 can be can be coupled to the periphery 114 of the rotatable element 112 through any suitable coupling method such as, but not limited to, adhesion, welding, fastening, or any combination thereof. Additionally, or alternatively, at least a portion of the first set of elements 118 or the second set of elements 120 can be integrally formed with the rotatable element 112.

The rotor assembly 102 can further include a containment band 122 that can circumscribe the first set of elements 118 and the second set of elements 120. The containment band 122 can include a series of circumferentially arranged materials, specifically a first set of material 124 and a second set of material 126. The first set of material 124 and the second set of material 126, similar to the first set of elements 118 and the second set of elements 120, can be alternately spaced about containment band 122. As illustrated, the first set of material 124 and the second set of material 126 can extend in the circumferential direction along a portion of the first set of elements 118 or the second set of elements 120, however, it will be further appreciated that the first set of material 124 and the second set of material 126 can also extend in the axial direction along the first set of elements 118, 120. Specifically, at least a portion of the first set of material 124 and the second set of material 126 can extend in the axial direction parallel to the rotational axis 41.

As best illustrated in an enlarged view 128, the first set of material 124 and the second set of material 126 of the containment band 122 can overlay and correspond to a at least a portion of the first set of elements 118 and the second set of elements 120. In one non-limiting example, the first set of material 124 can at least partially overlay the first set of elements 118, and the second set of material 126 can at least partially overlay the second set of elements 120. As illustrated, the first set of material 124 and the second set of material 126 can overlay and correspond to the first set of elements 118 and the second set of elements 120, respectively. Specifically, an inner circumferential surface of the first set of material 124 and the second set of material 126 (e.g., a radially innermost surface of the containment band 122 with respect to the rotational axis 41) can be the same as an outer circumferential surface of the first set of elements 118 and the second set of elements 120, respectively (e.g., a radially outermost surface of the first set of elements 118 and the second set of elements 120 with respect to the rotational axis 41). As such, the first set of material 124 can completely overlay and correspond to the first set of elements 118, and not cover or overlay at least a portion of the second set of elements 120, and the second set of material 126 can completely overlay and correspond to the second set of elements 120, and not cover or overlay at least a portion of the first set of elements 118.

The first set of material 124 and the second set of material 126 can further be defined by their magnetic permeability. Specifically, the first set of material 124 can include a first magnetic permeability and the second set of material 126 can include a second magnetic permeability that is lower than the first magnetic permeability. In one non-limiting example, it is contemplated that the first magnetic permeability can be between 10 and 1,000,000 times greater than the second magnetic permeability. It will be appreciated that as used herein, the term "low magnetic permeability" of the first set of material 124 can also include "non-magnetically permeable," whereby the material prevents or resists magnetic field or magnetic flux interaction.

The first set of material 124 and the second set of material 126 can each define regions of the containment band 122 of discrete materials or components that can be coupled to each other through various coupling methods. For example, the first set of material 124 and the second set of material 126 of the containment band 122 can be coupled through, but is not limited to, at least one of welding, adhesion, fastening, or any combination thereof. It will be appreciated that through the coupling of the first set of material 124 and the second set of material 126 that the containment band 122 can be formed.

It is contemplated that the first set of material 124 can be any suitable high magnetically permeable material such as, but not limited to, mild carbon steels, medium carbon steels, or high carbon steels, silicon steel, magnetic stainless steels, chromium steel alloys (e.g., 17-4PH), or any other suitable material or any combinations thereof. The second set of material 126 can be any suitable low, or non-magnetically permeable material such as, but not limited to, nickel-chromium based alloys, titanium alloys, non-magnetic stainless steels or any other suitable material or any combinations thereof.

It is contemplated, however, that the containment band 122 can be formed of a single material (e.g., the first set of material 124 and the second set of material 126 are each the same material). In such a case, the containment band 122 can be treated during manufacturing of the containment band 122 such that the material properties of the first set of material 124 and the second set of material 126 are still such that the first magnetic permeability of the first set of material 124 is higher than the second magnetic permeability of the second set of material 126. As such, the first set of material 124 and the second set of material 126 can be further defined as a set of first regions defined by the first magnetic permeability, and a set of second regions defined by the second magnetic permeability, respectively, with the set of first regions and the set of second regions each being the same material. In such a case, the containment band 122 can be defined as a dual-phase containment band 122 formed of a single material with alternating regions of high magnetic permeability and low magnetic permeability.

It will be yet further appreciated that the containment band 122 can be formed through various manufacturing processes, whether or not the first set of material 124 and the second set of material 126 are the same material or different materials. For example, as discussed herein, the first set of material 124 and the second set of material 126 can be coupled to one another through adhesion, welding, fastening, or the like. Additionally, or alternatively, the first set of material 124 and the second set of material 126 can be cast, additively manufactured, or the like.

The stator assembly 104 can circumscribe the rotor assembly 102, specifically the stator assembly 104 can circumscribe the containment band 122 of the rotor assembly 102 and be displaced radially outward from the containment band 122. The space formed between an outer radial limit of the containment band and an inner radial limit of the stator assembly 104 can define a gap. The stator assembly can include a stator casing 106. A set of circumferentially spaced posts 108 or stator posts can be formed within the stator casing 106. A set of windings 110 or stator windings, similar to the set of stator windings 90 described herein, can be wound about the set of posts 108.

As discussed herein, during power-generating operations, the rotor assembly 102, specifically the rotatable element 112, is mechanically powered, driven, or rotated by a force such as a mechanical energy. As the first set of elements 118 and the second set of elements 120, and the containment band 122 are ultimately coupled to the rotatable element 112, the first set of elements 118 and the second set of elements 120 and the containment band 122 will co-rotate with the rotatable element 112. The relative rotational motion of the rotatable element 112 and the co-rotating components, including at least the first set of elements 118, relative to the fixed or stationary stator assembly 104, generates electrical power in the set of stator windings 90 due to the interaction with the magnetic field or magnetic circuit generated by the first set of elements 118.

Figure 5:
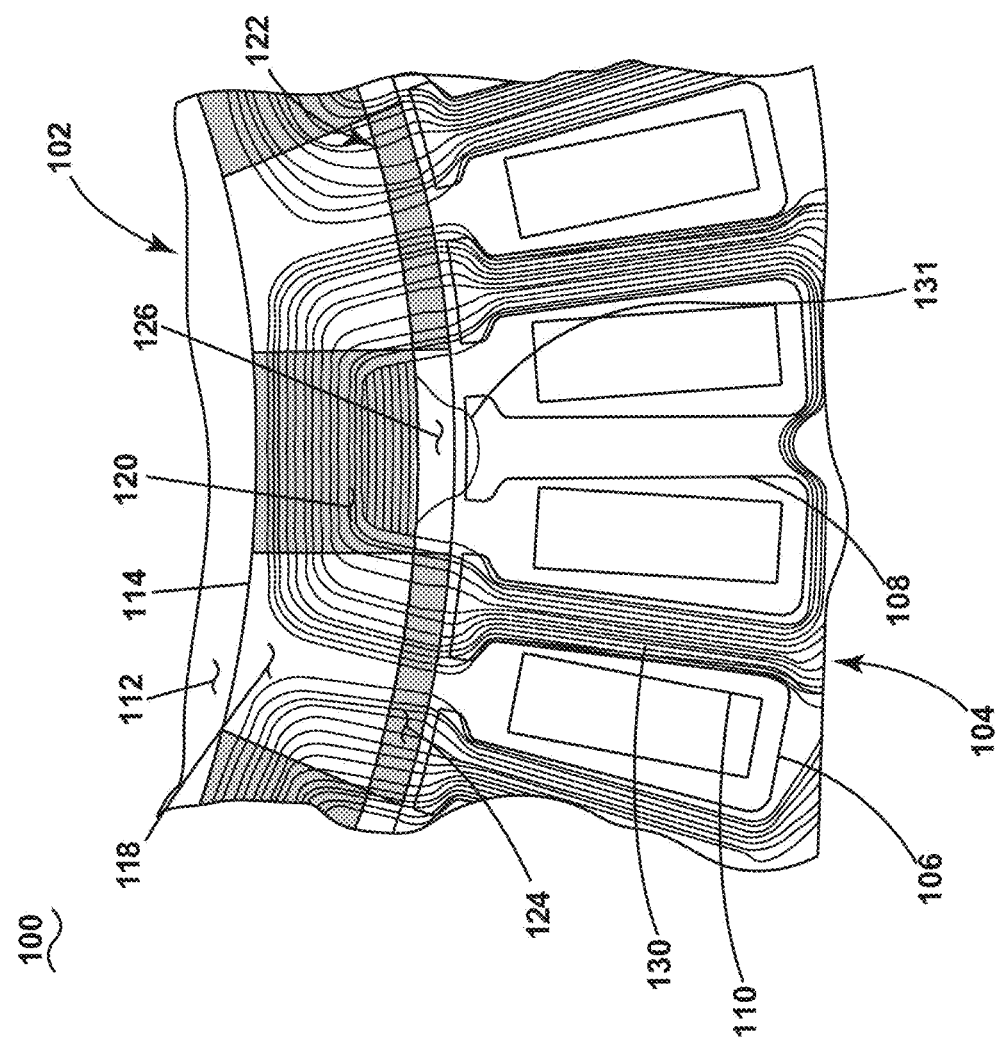
FIG. 5 is a sectional view of the rotor/stator assembly taken from section V of FIG. 4, further illustrating a magnetic field, in accordance with various aspects as described herein.
Figure 6:
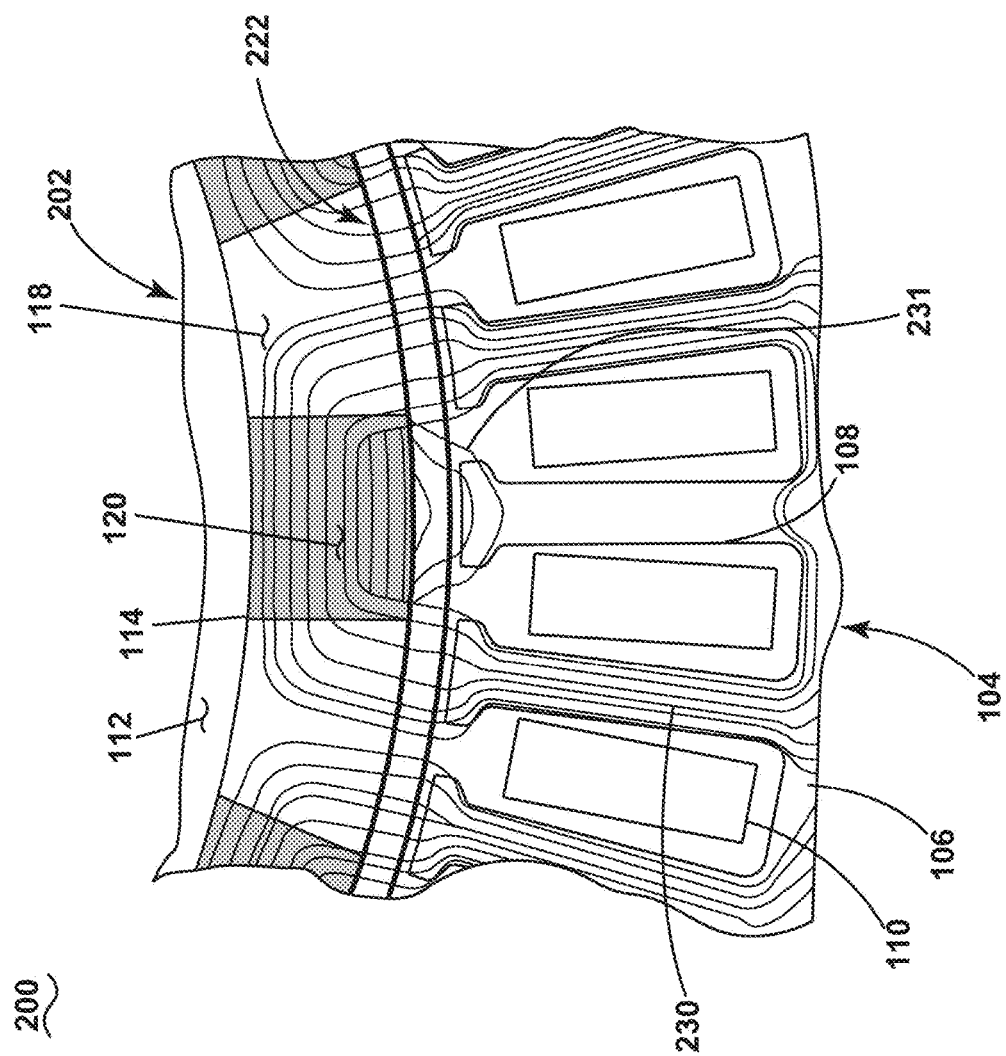
FIG. 6 is a sectional view of an exemplary rotor/stator assembly taken from section V of FIG. 4, further illustrating an exemplary magnetic field, in accordance with various aspects as described herein.

FIG. 5 and FIG. 6 illustrate a portion of the rotor/stator assembly 100 and a portion of an exemplary rotor/stator assembly 200, respectively, as seen from sight line V of FIG. 4. The exemplary rotor/stator assembly 200 is similar to the rotor/stator assembly 100; therefore, like parts will be identified with like numerals in the 200 series, with it being understood that the description of the like parts of the rotor/stator assembly 100 applies to the rotor/stator assembly 200 unless otherwise noted. It will be appreciated that the rotor/stator assembly 200 can be defined as a conventional rotor/stator assembly and that FIG. 5 and FIG. 6 illustrate a comparison between the two rotor/stator assemblies 100, 200. Specifically, FIG. 5 and FIG. 6 each illustrated a magnetic circuit 130, 230, respectively, that is generated by the corresponding first set of elements 118. The main difference between the two rotor/stator assemblies 100, 200 is that a rotor assembly 202 of the rotor/stator assembly 200 includes a containment band 222 formed by a single material that has a lower, similar, or identical magnetic permeability than the second set of material 126 of the containment band 122, whereas, the containment band 122 of the rotor/stator assembly 100 includes the first set of material 124 defined by a high magnetic permeability and the second set of material 126 defined by a lower magnetic permeability.

As illustrated, the magnetic circuits 130, 230 are each denoted by a series of lines passing from the first set of elements 118, through the corresponding containment band 122, 222, and ultimately through the stator assembly 104. A magnetic flux density is represented by the number and proximity of the series of lines.

As illustrated, the magnetic flux density passing through the posts 108 and around the stator winding 110 of the rotor/stator assembly 100 is larger than the magnetic flux density passing through the posts 108 and around the stator winding 110 of the rotor/stator assembly 200. This is because of the alternately spaced first set of material 124 and the second set of material 126 of the containment band 122. As the first set of material 124 has a higher magnetic permeability than the second set of material 126, there is a path of increased permeance that the magnetic circuit 130 can pass through. Specifically, the magnetic circuit 130 will pass through the highly permeable first set of material 124 instead of passing through the second set of material 126. This, in turn, ensures a greater flux density passing to the posts 108 and ultimately linking to the stator winding 110 in order to generate a current. As the second set of material 126 can still include some magnetic permeability, a small amount of the magnetic circuit 130 defined as a leakage flux 131 can be channeled from a radially outer surface of the second set of elements 120, through the second set of material 126 and to the post 108, as illustrated. This leakage flux 131 is not useful in generating a current through the windings 110 as it does not pass around the link the windings 110 and generate a current. Instead, the leakage flux 131 leaves the rotor assembly 102, passes through the containment band 122, and ultimately back to the rotor assembly 102 without ever linking the stator winding 110. As such, it is beneficial to have a higher flux density of the magnetic circuit 130 that passes around or otherwise links to the stator winding 110 than it is to have a high flux density in the leakage flux 131. The flux that passes around the or otherwise links to the stator winding 110 before going back to the rotor assembly 102 can be defined as a magnetizing flux.

In contrast, as the containment band 222 of the rotor/stator assembly 200 does not include the first set of material 124 alternately spaced with respect to the second set of material 126, and instead includes a homogenous material of a single material property (e.g., of a single magnetic permeability) about the entirety of the containment band 222. As such, the magnetic circuit 230 includes a leakage flux 231 that has a higher flux density than the leakage flux 131 of the magnetic circuit 130. This is because the first set of material 124 of the rotor assembly 102 creates sections of increased permeance or decreased reluctance for the magnetic circuit 130 to pass through. As such, there will be a lower leakage flux 131 when compared to the magnetic circuit 230. The portion of the magnetic circuit 130, 230 that links to the windings 110 can be referred to as the main magnetic circuit. It is contemplated that having a high flux density in the main magnetic circuit is advantageous. The magnetic circuit 230 of the stator/rotor assembly 200 will include the leakage flux 231 with a higher flux density than the leakage flux 131 as there are no areas of increased permeance or decreased reluctance formed in the containment band 220, thus the main magnetic circuit of the stator/rotor assembly 200 has a lower flux density than the main magnetic circuit than the stator/rotor assembly 100.

The decrease in the magnetic flux density linking the windings 110 when comparing the rotor/stator assembly 200 to the rotor/stator assembly 100 means that the rotor/stator assembly 200 will have a lower flux density, a higher amount of leakage flux, a lower voltage output, and a lower power density. This ultimately results in an electric machine including the rotor/stator assembly 200 including a containment band 222 with the homogenous material having a lower efficiency and power output than the electric machine including the rotor/stator assembly 100 with the containment band 122 having the first set of material 124 and the second set of material 126.

Figure 7:
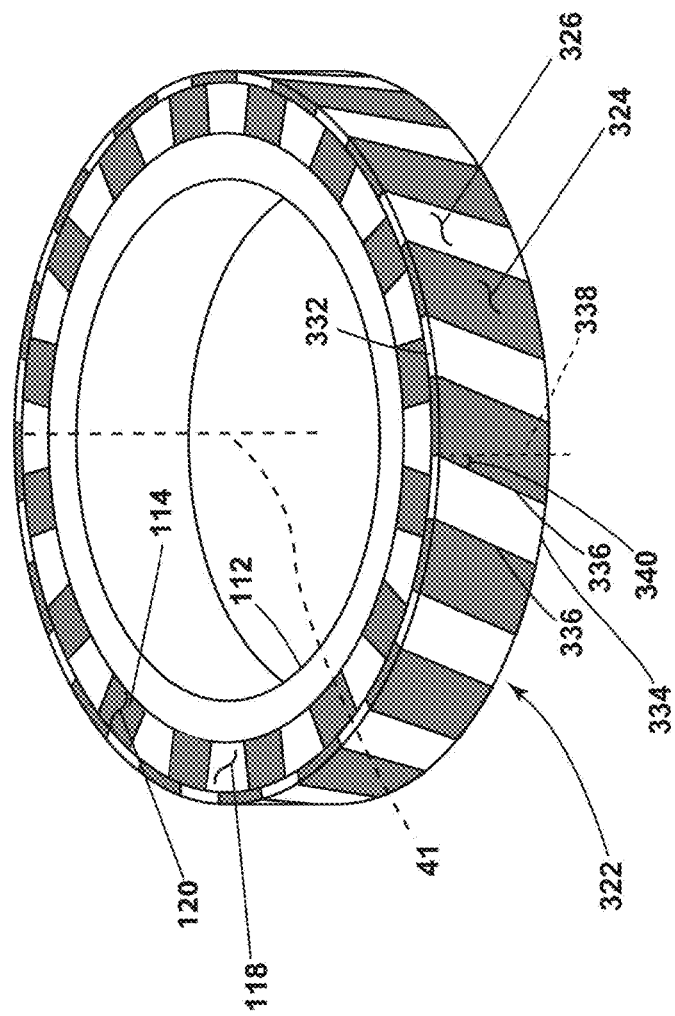
FIG. 7 is a perspective view of an exemplary rotor assembly of the rotor/stator assembly of FIG. 4, further including a skewed containment band, in accordance with various aspects as described herein.

FIG. 7 is a perspective view of an exemplary rotor assembly 302 similar to the rotor assembly 102 of FIG. 4. The rotor assembly 302 is similar to the rotor assembly 102; therefore, like parts will be identified with like numerals in the 300 series, with it being understood that the description of the like parts of the rotor assembly 102 applies to the rotor assembly 302 unless otherwise noted.

As discussed herein, the first set of elements 118 and the second set of elements 120 can extend in the circumferential and axial directions along the periphery 114 and be parallel to the rotational axis 41 in the axial direction. The rotor assembly 302, however, can further include a skewed containment band 322 defined by a first set of material 324 and a second set of material 326. The first set of material 324 and the second set of material 326 can each include a first axial edge 332 and a second axial edge 334 connected by a pair of side faces 336 interconnecting the first axial edge 332 and the second axial edge 334. The pair of side faces 336 can be parallel to one another. Although the first axial edge 332, the second axial edge 334, and the pair of side faces 336 are only illustrated on a single second material 326 of the containment band 322, it will be appreciated any number of the first set of material 324 and any number of the second set of material 326 can include these same features.

The first set of material 324 and the second set of material 326 are similar to the first set of material 124 and the second set of material 126 the rotor assembly 102, except that the first set of material 324 and the second set of material 326 extend from the first axial edge 332 to the second axial edge 334 in a direction that is not parallel to the rotational axis 41. As such, the pair of side faces 336 are not parallel to the rotational axis 41. In other words, the pair of side faces 336, and hence the first set of material 324 and the second set of material 326, are skewed with respect to the rotational axis 41 or with respect to the direction of axial extension of the first set of elements 118 or the second set of elements 120. If these same pair of side faces 336 were to be illustrated on the containment band 122, they would be parallel to the rotational axis 41.

To further illustrate this, a projection 338, which is parallel to the rotational axis 41, from the first axial edge 332 has been drawn. A skew angle 340 can be formed between the projection 338 and a corresponding side face 336. It is contemplated that the skew angle 340 will vary between electric machines and the number slots within the stator assembly 104 (e.g., the space formed between adjacent posts 108 that the windings 110 are received within), and is dependent on the size of the rotor assembly 302, or the number of elements included within the first set of elements 118 and the second set of elements 120. As illustrated, the first axial edges 332 of the first set of material 324 can extend across at least a portion of a corresponding second element 120 and at least a portion of a corresponding first element 118 of the first set of elements 118, while the second axial edge 334 can extend across at least a portion of the corresponding second element 120 of the second set of elements 120 and at least a portion of a corresponding first element 118 that is adjacent to the corresponding first element 118 that the first axial edge 332 extends across at least a portion of. Similarly, the first axial edges 332 of the second set of material 326 can extend across at least a portion of a corresponding first element 118 and at least a portion of a corresponding second element 120, while the second axial edge 334 can extend across at least a portion of the corresponding first element 118 and at least a portion of a corresponding second element 120 that is adjacent to the corresponding second element 120 that the first axial edge 332 extends across at least a portion of Specifically, half of the first axial edge 332 of the first set of material 324 can extend across a corresponding second element 120 and the other half can extend across a corresponding first element 118, while half of the second axial edge 334 can extend across the other half of the corresponding second element 120 and the other half can extend across a first element 118 adjacent to the corresponding first element 118 that the first axial edge 332 extends across a portion of. Specifically, half of the first axial edge 332 of the second set of material 326 can extend across a corresponding first element 118 and the other half can extend across a corresponding second element 120, while half of the second axial edge 334 can extend across the other half of the corresponding first second element 120 and the other half can extend across a second element 120 adjacent to the corresponding second element 120 that the first axial edge 332 extends across a portion of. Additionally, or alternatively, at least a portion of the first axial edges 332 or the second axial edges 334 can extend across any portion of a corresponding first element 118 or second element 120.

It is contemplated that the containment band 322 including the skew can provide various benefits to the electric machine when compared to the electric machine including the containment band 122 without the skew. Specifically, the containment band 322 with the skew can decrease the harmonic distortion generated by the rotor/stator assembly 300, decrease the cogging torque due to the interaction between the first set of elements 118 and the posts 108, and further decrease the slot ripple and eddy current losses. This ultimately can increase the efficiency of the rotor/stator assembly 300 when compared to the rotor/stator assembly 100.

Figure 8:
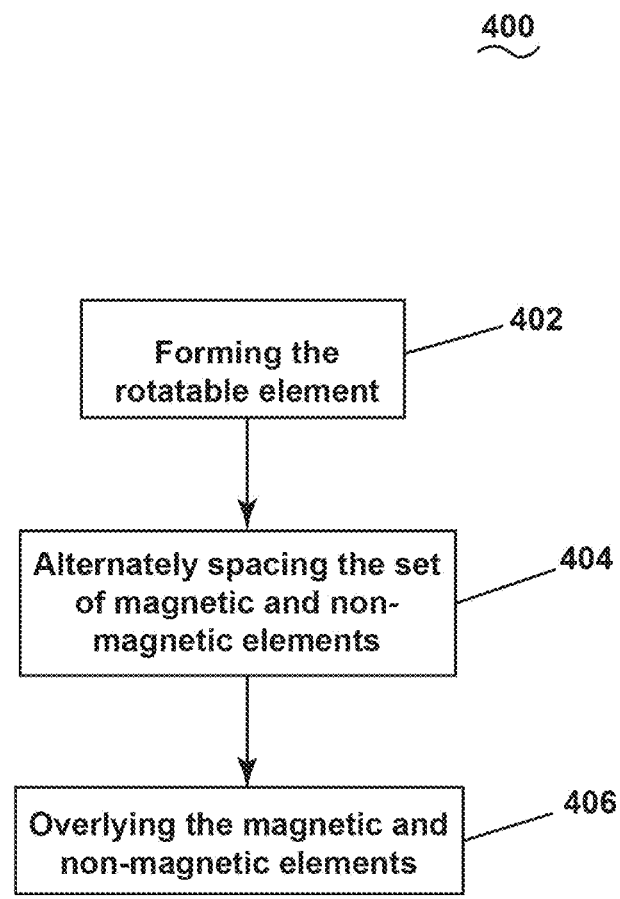
FIG. 8 is a method of forming the rotor assembly of FIG. 4, in accordance with various aspects as described herein.

FIG. 8 is a non-limiting example method 400 of assembling the rotor assembly 100 of FIG. 4. Although described in terms of the rotor/stator assembly 100 and the containment band 122, it will be appreciated that the methods described can be applied to the rotor/stator assembly 300 and the containment band 322, or any other suitable rotor/stator assembly including either the containment band 122 or 322.

The method 400 can begin with forming the rotatable element 112, at 402. The first set of elements 118 and the second set of elements 120 can then be alternately spaced over the periphery 114 of the rotatable element 112, at 404. The first set of elements 118 and the second set of elements 120 can subsequently be overlaid by the first set of material 124 and the second set of material 126, at 406. Specifically, at least a portion of the first set of elements 118 can be overlaid by the first set of material 124 defined by the first magnetic permeability, and at least apportion of the second set of elements 120 can be overlaid by the second set of material 126 defined by the second magnetic permeability lower than the first magnetic permeability.

The sequence depicted is for illustrative purposes only and is not meant to limit the method 400 in any way as it is understood that the portions of the method can proceed in a different logical order, additional or intervening portions can be included, or described portions of the method can be divided into multiple portions, or described portions of the method can be omitted without detracting from the described method. For example, the method 400 can include various other steps.

In one non-limiting example, the method 400 can include alternately spacing the first set of material 124 and the second set of material 126 such that they correspond to the first set of elements 118 and the second set of elements 120, respectively. In some instances, such as in the method 400 to assembly the rotor assembly 302, the alternate spacing of the first set of material 324 and the second set of material 326 can also include skewing at least a portion of the first set of material 324 and the second set of material 326 such that the containment band 322 is skewed with respect to the first set of elements 118 or the second set of element 120, respectively. The method 400, whether the containment band 122, 322 is skewed or not, can further include coupling the first set of material 324 alternately spaced from the second set of material 326 to each other. It is contemplated that the coupling can be done through any suitable coupling method such as, but not limited to, adhesion, welding, fastening, or any combination thereof.

In yet another non-limiting example, the method 400 can include forming the containment band 122, 322 of a single homogenous material such that the first set of material 124, 324 and the second set of material 126, 326 define a set of first regions and a set of second regions, respectively, including the same material, however, with differing material properties. Specifically, the set of first regions can be defined by a first magnetic permeability and the set of second regions can be defined by a second magnetic permeability that is lower than the first magnetic permeability. In other words, the containment band 122, 322 can be formed as a dual-phase, homogenous material containment band 122, 322.

In yet another non-limiting example, the method 400 can include alternately spacing the first set of magnetic material and the second set of magnetic material of the first set of elements 118 about the periphery 114. As such, each second element 120 can separate a corresponding first magnetic material from an adjacent second magnetic material, with the first set of magnetic material and the second set of magnetic material being oppositely magnetized.

It is contemplated that aspects of this disclosure can be advantageous for use over conventional rotor/stator assemblies. For example, conventional rotor/stator assemblies, specifically conventional rotor assemblies, rely on a containment band formed of a homogenous, magnetically low permeability material. This homogenous material includes low permeability to prevent the flux of the magnetic circuit from passing or shorting from one magnetic pole to the other, bypassing the main magnetic circuit. A consequence of a low permeability containment band circumscribing the rotor, is that for a given gap between the rotor assembly and the stator assembly, the reluctance of the magnetic circuit is increased. The rotor/stator assembly as discussed herein, however, utilizes a containment band including a first set of material defined by the high magnetic permeability and a second set of material defined by the low magnetic permeability. As discussed herein, the inclusion of alternating regions of high and low permeability ensure a higher magnetic flux density in the gap and increased flux linking the stator windings when compared to conventional rotor assemblies, due to the decreased reluctance offered by the high permeability of the first material. In other words, the magnetic flux generated between oppositely magnetized magnetic materials can be channeled through the main magnetic circuit by going through the sections of the containment band defined by the first material, effectively decreasing the gap and accordingly, the reluctance of the magnetic circuit. This, in turn, ensures that there is a greater flux density around the stator windings in the rotor/stator assembly described herein as opposed to the conventional rotor/stator assembly. An increase in the flux density ultimately results in a greater voltage output and power density of the electric machine.

Further advantages of the rotor/stator assembly include the ability to increase the gap between the rotor assembly and the stator assembly, when compared to conventional rotor/stator assemblies for the same power output. For example, conventional rotor/stator assemblies rely on the homogenous, magnetically non-permeable containment band and as such, the thickness of the containment band is added to the thickness of the magnetic parts of the rotor, which together defines the gap. The length of this gap is often defined by manufacturing tolerances and limitations. In general, the gap being larger has numerous advantages and is desirable. As discussed in the section above, the design described herein uses the higher permeability sections of the containment band as part of the magnetic circuit. As such the gap, and more specifically an electromagnetic gap, is reduced. This reduction in electromagnetic gap allows for the outer diameter of the rotor to be smaller when compared to conventional rotor designs for a given power output and containment band thickness. This is because the gap is larger in conventional rotor/stator assemblies when compared to the gap between the rotor assembly and stator assembly described herein. It is contemplated that the larger the gap, the more likely the electric machine will experience a reduction in magnetic flux density, leakage, voltage, and power density. The electromagnetic gap between the rotor and a stator assembly is smaller in the rotor/stator assembly as described herein, because the containment band fills up a portion of the gap without compromising the flux linkage between the rotor assembly and stator assembly. This is due to the alternate spacing of the set of the first material with respect to the set of the second material which allow the containment band to not hinder the magnetic circuit generated by the magnetic poles. This ultimately results in a greater voltage and power output of the electric machine without having to change the parameters of the electric machine.

Further advantages of the rotor/stator assembly include a decreased harmonic distortion, cogging torque, slot ripple, and eddy current losses without an increased complexity in manufacturing when compared to conventional rotor/stator assemblies. For example, conventional rotor/stator assemblies can rely on skewing of either the magnetic materials on the rotor or the stator to reduce the harmonic distortion, cogging torque, slot ripple, and eddy current losses. However, this adds a layer of complexity when it comes to the manufacturing of the conventional rotor/stator assemblies as embedded components (e.g., the stator windings/posts, the set of magnetic materials or the set of non-magnetic materials) need to be skewed with respect to the rotational axis during manufacturing. The rotor/stator assembly as described herein, specifically the rotor/stator assembly including the skewed containment band, however, decreases the harmonic distortion, cogging torque, slot ripple, and eddy current losses without adding a large complexity in manufacturing when compared to the conventional rotor/stator assemblies with a skew. This is because the first set of material and the second set of material of the containment band are skewed, and not the stator windings, posts, the set of magnetic materials or the set of non-magnetic materials. The containment band can be manufactured separate of the rotor/stator assembly during which the first set of material and the second set of material can be skewed with respect to the rotational axis, the set of magnetic materials or the set of non-magnetic materials. This, in turn, ensures that the harmonic distortion, cogging torque, slot ripple, and eddy current losses are decreased, with respect to a rotor/stator assembly without skewing, without having an added layer of complexity added during the manufacturing process. Further yet, the cost of manufacturing the rotor/stator assembly is reduced when compared to traditional rotor/stator assemblies as less material, specifically magnetic material is required. This is because, for at least the reasons listed in the sections above, the electric machine including the rotor/stator assembly as described herein has a higher voltage output and power density than conventional rotor/stator assemblies. This, in turn, means that the rotor/stator assembly can be smaller and include less magnetic materials while at the same time producing the same, if not more, voltage output and power density as the larger conventional rotor/stator assembly. For at least the reasons above, this can decrease the total cost associated with manufacturing the rotor/stator assembly without sacrificing performance parameters (e.g., power density and voltage output).

It is yet further contemplated that benefits include a greater flexibility in the manufacturing process when compared to the conventional rotor/stator assemblies. As discussed above, the containment ring as described herein (with or without skewing) can reduce losses associated with the containment ring when compared to conventional rotor/stator assemblies. This reduction in losses, driven by the ability to have a larger airgap for an equivalent power output or by the reduction of harmonic losses due to skewing, can allow for a wider material selection or smaller containment band thickness (thickness of the containment band in the radial direction). This, in turn, yet further provides benefits during the manufacturing process when compared to the manufacturing of the conventional rotor/stator assemblies, as less material and a wider variety of material can be used without sacrificing the performance of the rotor/stator assembly.

Yet another advantage includes a reduction in stator windings or end turns within the stator assembly when compared to conventional rotor/stator assemblies. Specifically, for at least the reasons in the section above, the rotor/stator assembly as described herein increase the voltage output and power density, which means fewer amount of stator windings that have to present within the stator assembly to produce the same amount output voltage or power density when compared to the conventional rotor/stator assemblies. As stator windings are normally made form copper, the reduction in the amount of winding turns to achieve a given voltage means a reduction in the total amount of copper losses within the system is made possible by using the freed space to increase the size of the conductors, and ultimately increases the power density of the electric machine. Further yet, a reduction in the amount of stator windings, enables the reduction of end turn lengths which improves the performance of a machine and also means a reduction in manufacturing cost and complexity as a lesser number of stator turns are needed to generate the same amount of voltage output and power density as the conventional rotor/stator assembly.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Further aspects of the invention are provided by the subject matter of the following clauses:

A rotor assembly comprising a rotatable element defining a rotational axis and a periphery, a first set of elements disposed on at least a portion of the periphery and defining magnetic pole regions, a second set of elements disposed on at least a portion of the periphery and defining interpolar regions, wherein the first set of elements and the second set of elements are alternately placed along the periphery, and a containment band circumscribing the first set of elements and the second set of elements, the containment band defining a first set of material at least partially overlying the first set of elements and a second set of material at least partially overlying the second set of elements.

The rotor assembly of any preceding clause, wherein the first set of material has a first magnetic permeability, and the second set of material has a second magnetic permeability, with the first magnetic permeability being higher than the second magnetic permeability.

The rotor assembly of any preceding clause, wherein the first set of material and the second set of material are each the same material.

The rotor assembly of any preceding clause, wherein the first set of elements comprises a first set of magnetic materials, and a second set of magnetic materials, wherein the first set of magnetic material and the second set of magnetic material are oppositely magnetized and alternately provided about the periphery.

The rotor assembly of any preceding clause, wherein the first set of elements are a set of permanent magnets.

The rotor assembly of any preceding clause, wherein the second set of elements are a set of permanent magnets.

The rotor assembly of any preceding clause wherein the first set of material and the second set of material are skewed relative to the first set of elements and the second set of elements.

The rotor assembly of any preceding clause, wherein a first axial edge of a second material of the set of second material overlies at least a portion of a first element of the set of first elements and the at least a portion of a second element of the set of second elements, and a second axial edge of the second material, axially spaced from the first axial edge, overlies at least a portion of the second element and at least a portion of a first element that is adjacent to the first element that the first axial edge overlies.

The rotor assembly of any preceding clause, wherein the first set of material includes a chromium-steel alloy.

The rotor assembly of any preceding clause, wherein the second set of material includes a nickel-chromium based alloy.

An electric machine assembly including the rotor assembly of claim 1, and further comprising a stator assembly circumscribing the containment band, the stator assembly comprising a set of circumferentially spaced posts, and a set of windings wound about the set of posts, wherein the electric machine assembly is at least one of a motor, a generator, or a starter/generator The electric machine assembly any preceding clause, wherein the electric machine assembly includes a permanent magnet generator), and the rotor assembly is located within the permanent magnet generator.

The rotor assembly of any preceding clause, wherein the first set of material and the second set of material are alternately spaced such that they correspond to the alternate spacing of the first set of elements and the second set of elements, respectively.

The rotor assembly of any preceding clause, wherein the first set of elements are a set of energizable rotor windings The rotor assembly of any preceding clause, wherein the rotatable element is at least one of a permanent magnet generator rotor, an exciter rotor, or a main machine rotor.

The rotor assembly of any preceding clause, wherein the rotor assembly is a rotor core.

A rotor assembly comprising a rotatable element defining a rotational axis and a periphery, a first set of elements disposed at the periphery, a second set of elements being disposed on at least a portion of the periphery, wherein the first set of elements and the second set of elements are alternately placed along the periphery, and a containment band circumscribing the first set of elements and the second set of elements, the containment band defining a first set of material with a first magnetic permeability and a second set of material with a second magnetic permeability lower than the first magnetic permeability, wherein the first set of material and the second set of material are alternately spaced.

The rotor assembly of any preceding clause, wherein the first set of material overlays at least a portion of the first set of elements and the second set of material overlays at least a portion of the second set of elements.

A method of assembling a rotor assembly, the method comprising forming a rotatable element defined by a periphery, alternately spacing a first set of elements and a second set of elements about the periphery, with the first set of elements defining magnetic poles regions and the second set of elements defining interpolar regions, and overlying at least a portion of the first set of materials with a portion of a containment band including a first set of material defined by a first magnetic permeability, and at least a portion of the second set of elements with a portion of the containment band including a second set of material defined by a second magnetic permeability less than the first magnetic permeability.

The method of any preceding clause, further comprising assembling the containment band such that the first set of material and the second set of material are alternately spaced, and coupling the first set of material and the second set of material materials to one another, wherein coupling can include at least one of adhering, welding, or fastening.

What is claimed is:
1. A rotor assembly comprising:
a rotatable element defining a rotational axis and a periphery;
a first set of elements disposed on at least a portion of the periphery and defining magnetic pole regions;
a second set of elements disposed on at least a portion of the periphery and defining interpolar regions, wherein the first set of elements and the second set of elements are alternately placed along the periphery; and
a containment band circumscribing the first set of elements and the second set of elements, the containment band defining a first set of material at least partially overlying the first set of elements and a second set of material at least partially overlying the second set of elements.

2. The rotor assembly of claim 1, wherein the first set of material has a first magnetic permeability, and the second set of material has a second magnetic permeability, with the first magnetic permeability being higher than the second magnetic permeability.

3. The rotor assembly of claim 2, wherein the first set of material and the second set of material are each the same material.

4. The rotor assembly of claim 1, wherein the first set of elements comprises:
   a first set of magnetic materials; and
   a second set of magnetic materials;
   wherein the first set of magnetic material and the second set of magnetic material are oppositely magnetized and alternately provided about the periphery.

5. The rotor assembly of claim 1, wherein the first set of elements are a set of permanent magnets.

6. The rotor assembly of claim 1, wherein the second set of elements are a set of permanent magnets.

7. The rotor assembly of claim 1, wherein the first set of material and the second set of material are skewed relative to the first set of elements and the second set of elements.

8. The rotor assembly of claim 7, wherein a first axial edge of a second material of the set of second material overlies at least a portion of a first element of the set of first elements and at least a portion of another second element of the set of second elements, and a second axial edge of the second material, axially spaced from the first axial edge, overlies at least a portion of the second element and at least a portion of another first element that is circumferentially adjacent to the first element that the first axial edge overlies, with respect to the rotational axis.

9. The rotor assembly of claim 1, wherein the first set of material includes a chromium-steel alloy.

10. The rotor assembly of claim 1, wherein the second set of material includes a nickel-chromium based alloy.

11. An electric machine assembly including the rotor assembly of claim 1, and further comprising:
    a stator assembly circumscribing the containment band, the stator assembly comprising:
        a set of circumferentially spaced posts; and
        a set of windings wound about the set of circumferentially spaced posts;
    wherein the electric machine assembly is at least one of a motor, a generator, or a starter/generator.

12. The electric machine assembly of claim 11, wherein the electric machine assembly includes a permanent magnet generator, and the rotor assembly is located within the permanent magnet generator.

13. The rotor assembly of claim 1, wherein the first set of material and the second set of material are alternately spaced such that they correspond to the alternate spacing of the first set of elements and the second set of elements, respectively.

14. The rotor assembly of claim 1, wherein the first set of elements are a set of energizable rotor windings.

15. The rotor assembly of claim 1, wherein the rotatable element is at least one of a permanent magnet generator rotor, an exciter rotor, or a main machine rotor.

16. The rotor assembly of claim 1, wherein the rotor assembly is a rotor core.

17. A rotor assembly comprising:
    a rotatable element defining a rotational axis and a periphery;
    a first set of elements disposed at the periphery;
    a second set of elements being disposed on at least a portion of the periphery, wherein the first set of elements and the second set of elements are alternately placed along the periphery; and
    a containment band circumscribing the first set of elements and the second set of elements, the containment band defining a first set of material with a first magnetic permeability and a second set of material with a second magnetic permeability lower than the first magnetic permeability, wherein the first set of material and the second set of material are alternately spaced.

18. The rotor assembly of claim 17, wherein the first set of material overlays at least a portion of the first set of elements and the second set of material overlays at least a portion of the second set of elements.

19. A method of assembling a rotor assembly, the method comprising;
    forming a rotatable element defined by a periphery;
    alternately spacing a first set of elements and a second set of elements about the periphery, with the first set of elements defining magnetic poles regions and the second set of elements defining interpolar regions; and
    overlying at least a portion of the first set of elements with a portion of a containment band including a first set of material defined by a first magnetic permeability, and at least a portion of the second set of elements with a portion of the containment band including a second set of material defined by a second magnetic permeability less than the first magnetic permeability.

20. The method of claim 19, further comprising:
    assembling the containment band such that the first set of material and the second set of material are alternately spaced; and
    coupling the first set of material and the second set of material to one another, wherein coupling can include at least one of adhering, welding, or fastening.

* * * * *